(12) United States Patent
Danev (10) Patent No.: US 8,356,856 B2
(45) Date of Patent: Jan. 22, 2013

(54) FRONT SPOILER FOR A MOTOR VEHICLE

(75) Inventor: Dimitar Danev, Renningen (DE)

(73) Assignee: H.C.F. Porsche Aktiengesellschaft (DE)

( * ) Notice: Subject to any disclaimer, the term of this patent is extended or adjusted under 35 U.S.C. 154(b) by 0 days.

(21) Appl. No.: 13/466,211

(22) Filed: May 8, 2012

(65) Prior Publication Data

US 2012/0292943 A1    Nov. 22, 2012

(30) Foreign Application Priority Data

May 16, 2011    (DE) .......................... 10 2011 050 373

(51) Int. Cl.
*B60J 7/00*    (2006.01)
(52) U.S. Cl. .................................................. 296/180.1
(58) Field of Classification Search ................ 296/180.1
See application file for complete search history.

(56) References Cited

U.S. PATENT DOCUMENTS

| | | | | |
|---|---|---|---|---|
| 3,884,516 A * | 5/1975 | Gallion et al. | ................. | 293/120 |
| 4,585,262 A * | 4/1986 | Parks | .......................... | 296/180.1 |
| 4,976,489 A * | 12/1990 | Lovelace | .................... | 296/180.1 |
| 6,644,700 B2 * | 11/2003 | Ito et al. | ......................... | 293/117 |
| 6,964,441 B2 * | 11/2005 | Ariga et al. | .................... | 293/117 |

* cited by examiner

*Primary Examiner* — Joseph Pape
(74) *Attorney, Agent, or Firm* — Gerald E. Hespos; Michael J. Porco; Matthew T. Hespos (57) ABSTRACT

A front spoiler of a motor vehicle is held on the front end part of the vehicle by fastening elements. To reinforce the front spoiler in the central region, reinforcing ribs are provided, which extend into inward and outward formations on the front end part. The reinforcing ribs are preferably vertically aligned plate-shaped structures that extend in the longitudinal direction. To ensure a necessary dimensional stability of the front spoiler during driving, the reinforcing ribs can be supported on the front end part, and the front spoiler itself can be supported on the reinforcing ribs.

10 Claims, 10 Drawing Sheets

FRONT SPOILER FOR A MOTOR VEHICLE

CROSS REFERENCE TO RELATED APPLICATION

This application claims priority under 35 USC 119 to German Patent Appl. No. 10 2011 050 373.0 filed on May 16, 2011, the entire disclosure of which is incorporated herein by reference.

BACKGROUND OF THE INVENTION

1. Field of the Invention

The invention relates to a front spoiler for a motor vehicle.

2. Description of the Related Art

Front spoilers for motor vehicles are required to achieve a favorable drag coefficient and to obtain lift coefficients at the front and rear axles of the vehicle. The front spoiler is connected to a front end part of the vehicle and has a flow impingement surface that is rounded in a concave arc as an air guiding device.

It is the object of the invention to provide a front spoiler for a motor vehicle that is reinforced in a way to achieve dimensional stability and to fulfill an aerodynamic function during driving under loads imposed by wind blast or air forces.

SUMMARY OF THE INVENTION

The invention relates to a front spoiler for a motor vehicle. The central portion of the front spoiler has reinforcements that ensure dimensional stability when there is an incident flow of air, especially when there is an impinging wind blast. The reinforcements also ensure the aerodynamic function with respect to a desired drag coefficient Cw and lift coefficients Cav and Cah. Moreover, the invention ensures that none of the reinforcing measures leave traces on the outer skin. The central region of the front spoiler on both sides of a vehicle longitudinal center line preferably is reinforced with plate-shaped reinforcing ribs. The reinforcing ribs preferably are arranged on a head strip of the spoiler element and project vertically down behind the spoiler element, when viewed relative to the direction of travel. Additionally, the reinforcing ribs extend in the longitudinal direction of the vehicle. An elastically flexible region is defined on the spoiler element below the region that is reinforced by the reinforcing ribs. A continuous gap is provided between the reinforcing ribs and at least parts of the spoiler element so that the reinforcing ribs are not connected extensively to the spoiler element. Therefore externally visible traces of the reinforcing ribs will not arise on the front spoiler.

The positions of the reinforced region and the adjoining flexible region of the spoiler element depend on the length of the reinforcing ribs. More particularly, the flexible region is below a horizontal plane passing through the free ends of the reinforcing ribs, and the reinforced region of the front spoiler is above the plane. Thus, reinforcement and support of the front spoiler are achieved in the region of the principal load imposed by wind blasts. The flexible region of the front spoiler ensures that the spoiler is not damaged and can pivot in an elastically flexible manner on contact with obstacles, e.g. a curbstone.

The air impingement surface is on the front side of the spoiler element and the reinforcing ribs are on the rear side. Additionally, the transversely extending head strip at the top of the spoiler element is formed to be pivoted elastically within the gap. Thus, it is possible to adjust the balance between stiffness (aerodynamic function) and yield or flexibility (avoidance of damage) by changing the geometry of the reinforcement.

An upper region of each reinforcing rib preferably has an angular cutout. The cutout corresponds to an angle of the front end part and the reinforcing ribs are held at a distance from the adjoining front end part in this region. The angular cutout of the reinforcing rib comprises vertical and horizontal rib edges. The vertical rib edge is formed by a rectangular rib portion connected to the head strip and the horizontal rib edge is formed by an adjoining triangular rib portion.

The angular cutout of the reinforcing rib overlaps the angle of the front end part from the outside and below. The rectangular rib portion is in an angled front offset of the front end part. The gap between the spoiler element of the front spoiler and the front edge of the angular cutout of the reinforcing rib enables the spoiler element to be held on the front end part by fastenings in the basic unadjusted position. The horizontal edge of the reinforcing rib is a short distance from the angle or bottom surface of the front end part. The prevailing air pressure during driving pushes the front spoiler out of the basic position, into adjusted positions and onto the reinforcing ribs. The reinforcing ribs held elastically on the head strip come to rest against the front end part during this process. As a result, movement of the front spoiler toward the rear and counter to the direction of travel is blocked, and the front spoiler functions as an air guiding device.

The spoiler element can thus be moved about the pivoting axis from the basic position into the adjusted positions in accordance with air forces arising counter to the direction of travel and can contact the reinforcing ribs. The horizontal edge of the cutout of the reinforcing rib contacts the bottom surface of the front end part in the adjusted positions of the spoiler element.

The front spoiler preferably is fastened to the front end part by fastening hooks formed on the head strip and can be latched into corresponding openings of the front end part. It also is possible in addition to establish a connection between the front spoiler and the front end part by plate elements arranged on the free ends of the spoiler element. The plate elements may extend rearward across the underside of the front end part over a relatively large area and can be fastened to the front end part.

In summary, the invention provides a front spoiler that has a required dimensional stability during driving and that deforms only slightly when subjected to loads by wind blast (pressure), thereby fulfilling the desired aerodynamic function. At the same time, the front spoiler has a flexible lower region to avoid damage on contact with obstacles. The spoiler and the reinforcement are integrated and a separate reinforcement for the spoiler is avoided. Thus, no separate component is attached and the mounting of the spoiler and the reinforcement requires no additional outlay. No visible traces of the reinforcement will arise on the outer skin, and mounting takes place in only one direction.

BRIEF DESCRIPTION OF THE DRAWINGS

FIG. 5 is a vertical section through the front spoiler held on the front end part, together with the reinforcing ribs and the reinforcing portion drawn in.

DETAILED DESCRIPTION OF THE PREFERRED EMBODIMENTS

A front spoiler 1 for a motor vehicle is connected to a front end part 2 that is held on the vehicle body. The front spoiler 1 forms an air guiding device for the air flow L approaching counter to the direction of travel F. The front spoiler 1 has a spoiler element 3 with an aerodynamically effective air impingement surface to achieve a favorable drag coefficient Cw and lift coefficients Cav and Cah at the front and rear axles of the vehicle. The air impingement surface can be curved concavely to achieve aerodynamic effectiveness.

A reinforced portion V is formed in a central region of the front spoiler 1 on both sides of a vehicle longitudinal center line LA and includes reinforcing ribs 4 that are rearward of the spoiler element 3 when viewed in relation to the direction of travel F. Top ends of the reinforcing ribs 4 are integral with the spoiler element 3 of the front spoiler 1. The reinforcing ribs 4 preferably are plate-shaped and are aligned to project vertically down and to extend in the longitudinal direction of the vehicle. The number of reinforcing ribs 4 can be varied according to requirements. The spoiler element 3 has a reinforced region "a" aligned with the support ribs an elastically flexible region "b" that is lower than the reinforcing ribs 4.

Figure 9:
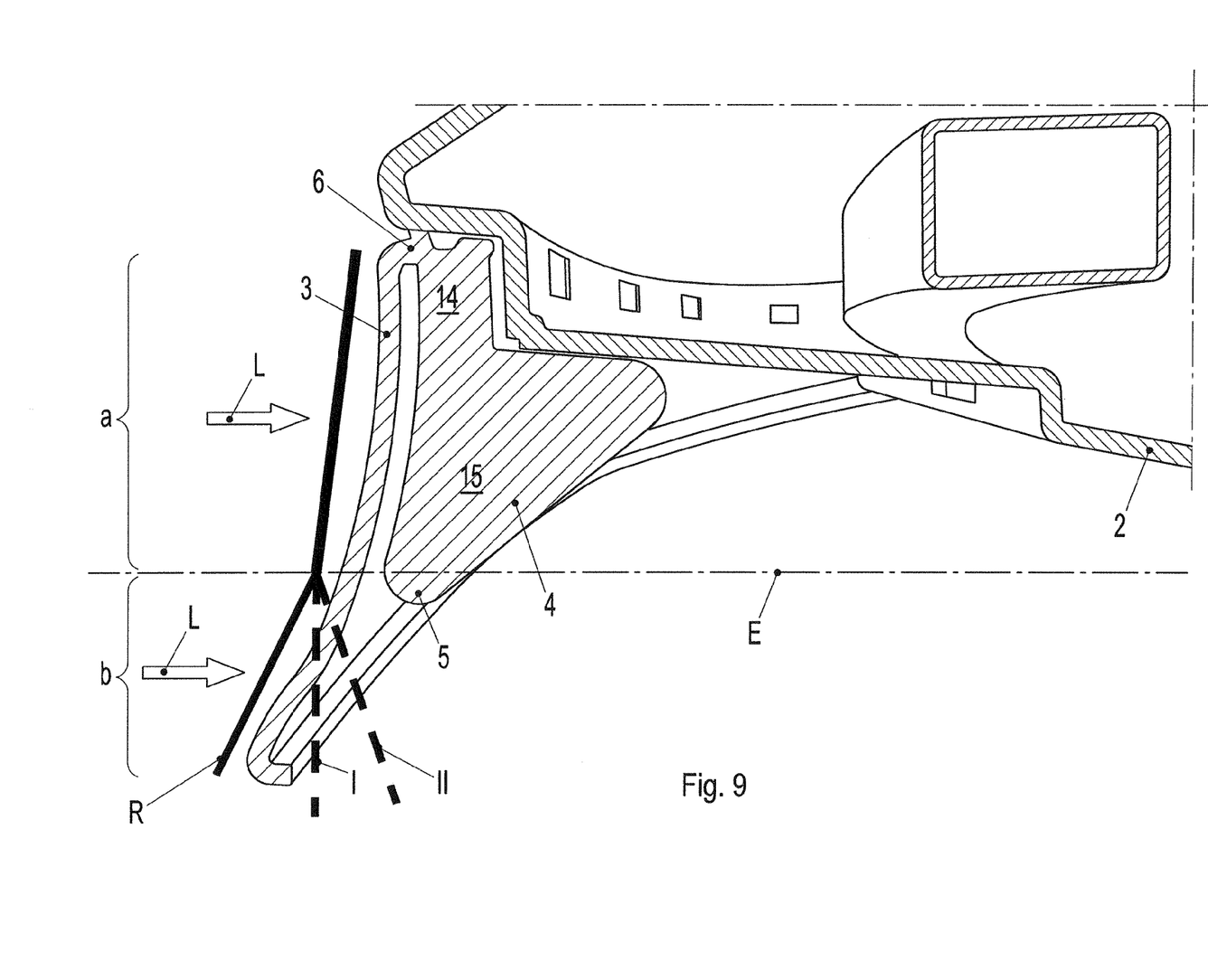
FIGS. 9 to 11 show the configuration of various lengths of reinforcing ribs to achieve different flexible areas of action of the spoiler element below the reinforcing region.
Figure 10:
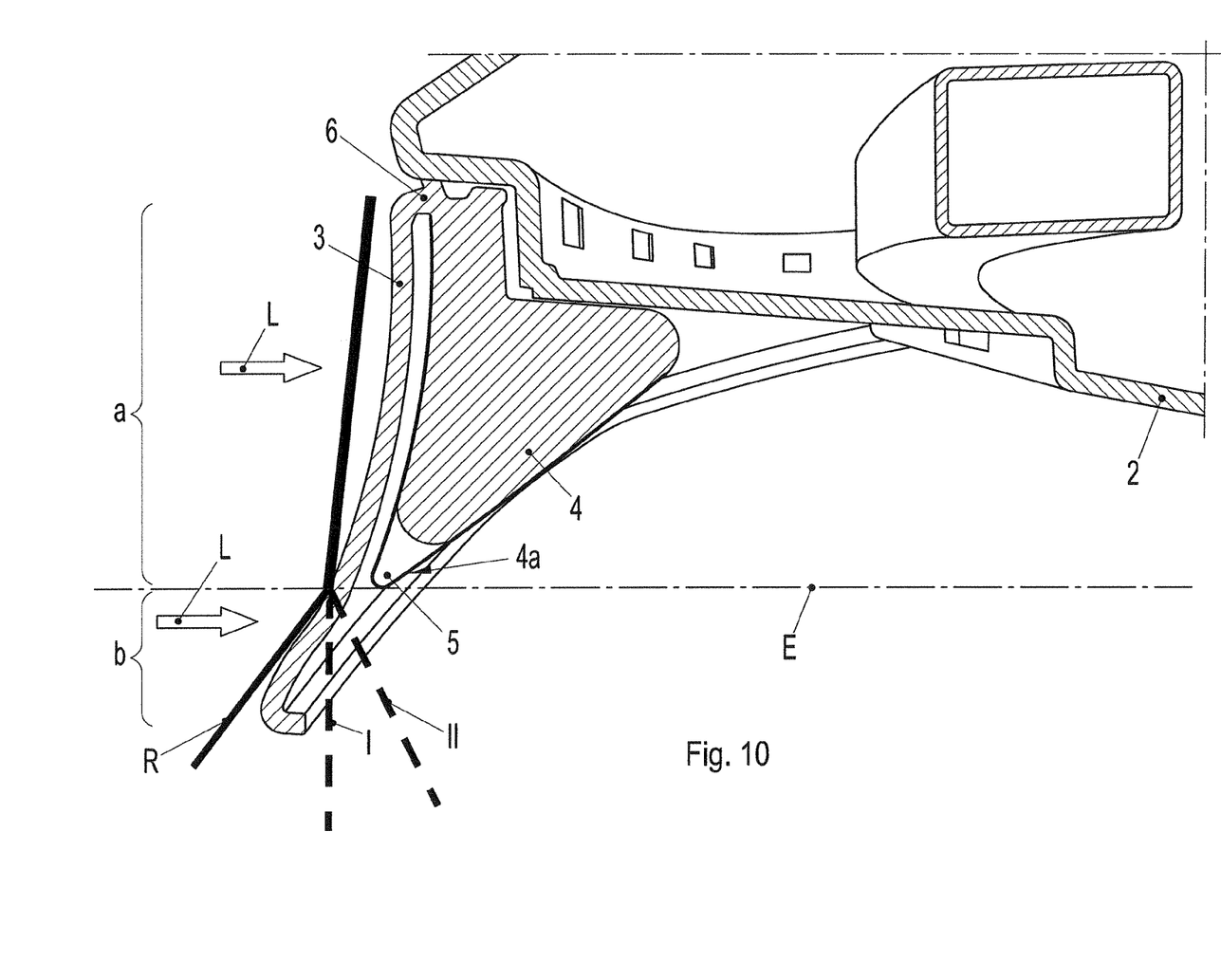
Figure 11:
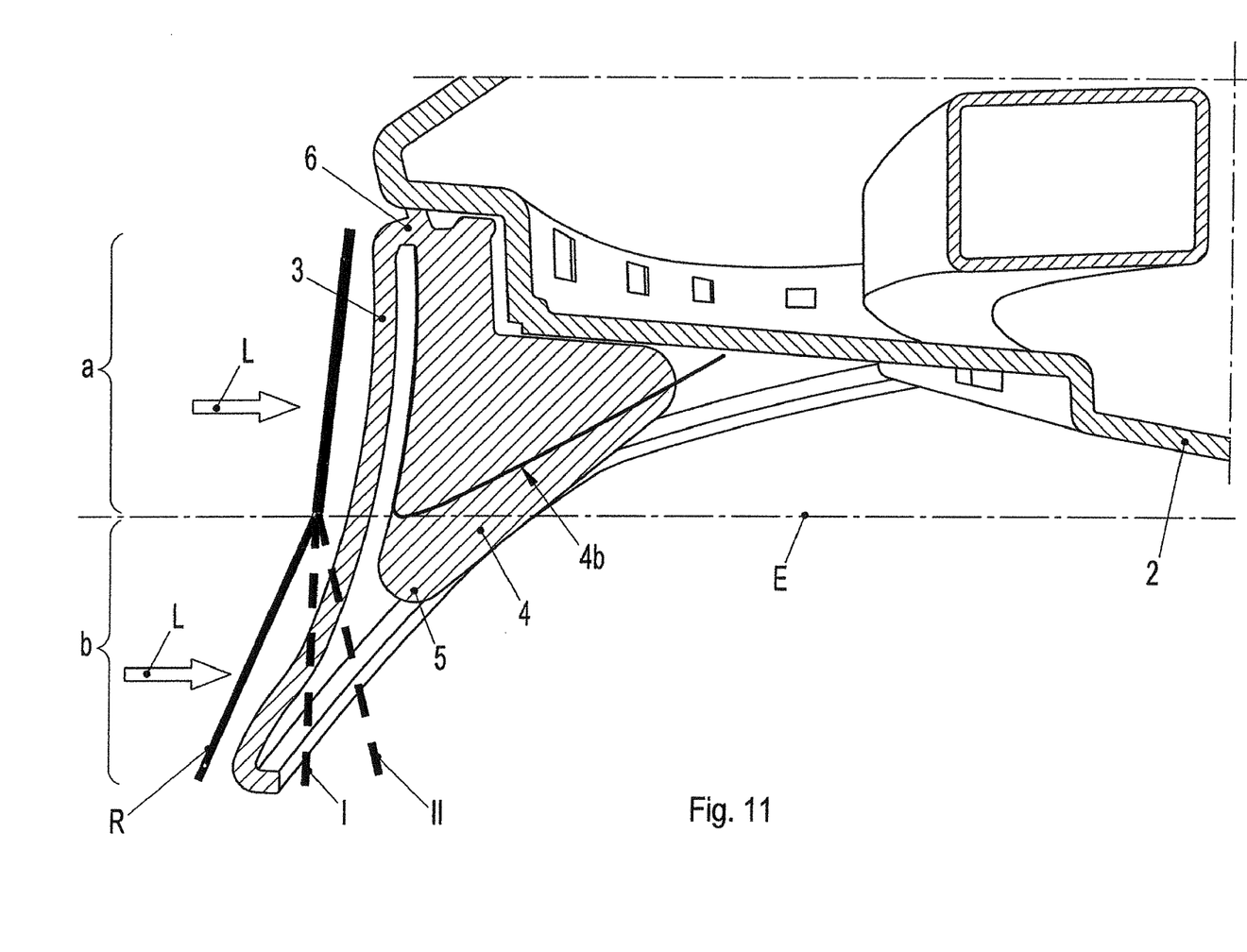

The demarcation between the reinforced region "a" and the flexible region "b" depends on the length of the reinforcing ribs 4. As illustrated in FIGS. 9 to 11, the flexible region "b" is formed below the horizontal plane E passing through the free ends 5 of the reinforcing ribs 4, and the reinforced region "a" of the spoiler element 3 of the front spoiler 1 is above the plane E. An extended reinforcing rib 4a is shown in FIG. 10, and a shortened reinforcing rib 4b is shown in FIG. 11. The flexible region "b" of the reinforcing ribs 4, 4a and 4b is pivotable from a rest position R to the schematically illustrated positions I and II. The longer ribs 4a shown in FIG. 10 displace the plane E down and thus increase the stiffness of the front spoiler 1. On the other hand, the shorter reinforcing ribs 4b in FIG. 11 displace the plane E up and increase the flexibility of the front spoiler 1.

The spoiler element 3 and the reinforcing ribs 4 project in an elastically pivotable manner integrally or unitarily from a head strip 6 of the spoiler element 3. In the rest position R, a continuous gap c exists between the spoiler element 3 and the reinforcing ribs 4 and a distance d exists between a rib edge 12 of the reinforcing rib 4 and the panel 16 of the front end part 2, as shown in regions 7 and 8 of FIG. 7. The rib edge 12 is horizontal in FIG. 7, but may be arranged on a slope.

Figure 1:
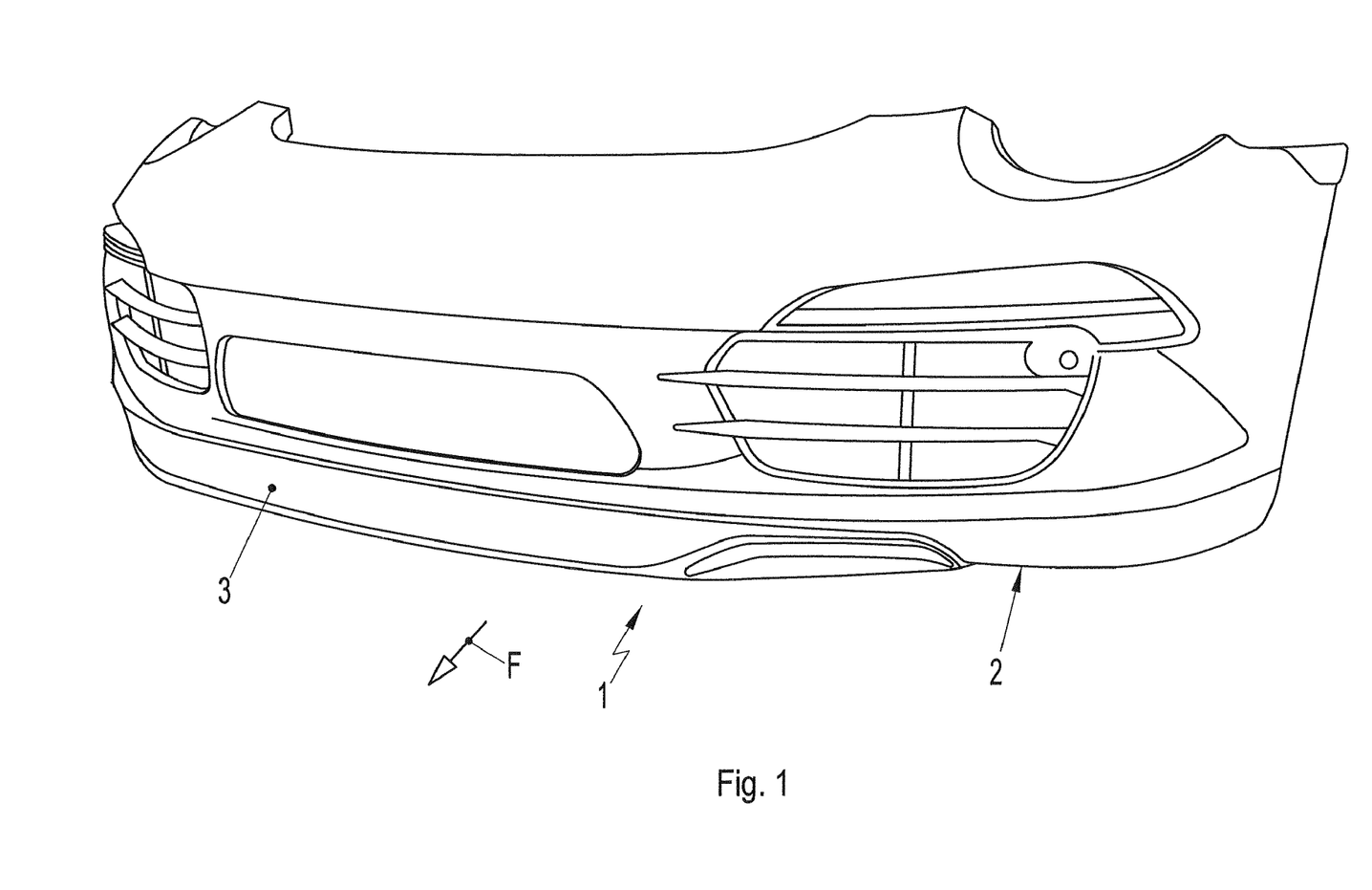
FIG. 1 is a view of a front spoiler fastened to the front end part of a motor vehicle.
Figure 2:
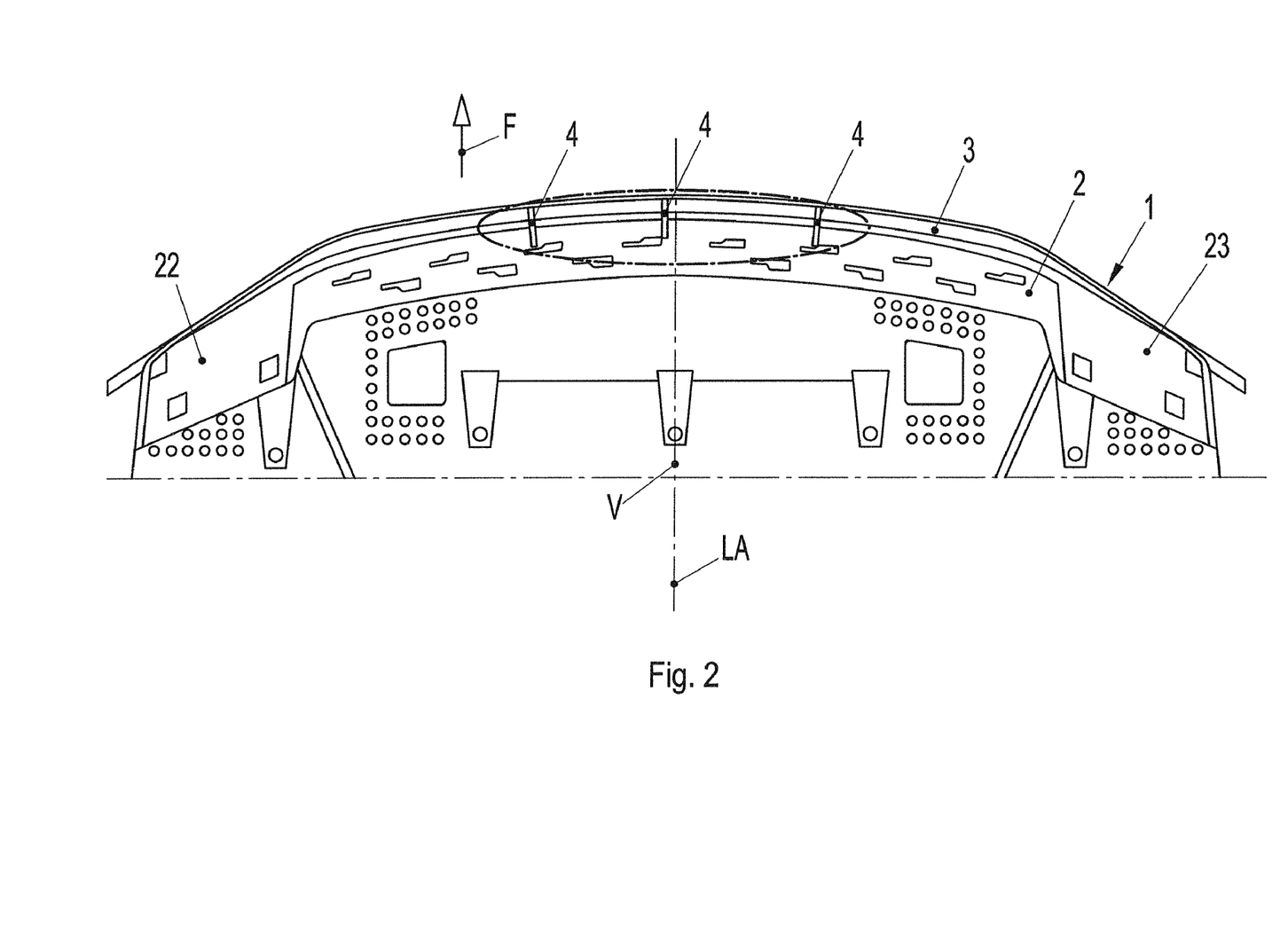
FIG. 2 is a bottom view of the front spoiler fastened to the front end part of the motor vehicle.
Figure 3:
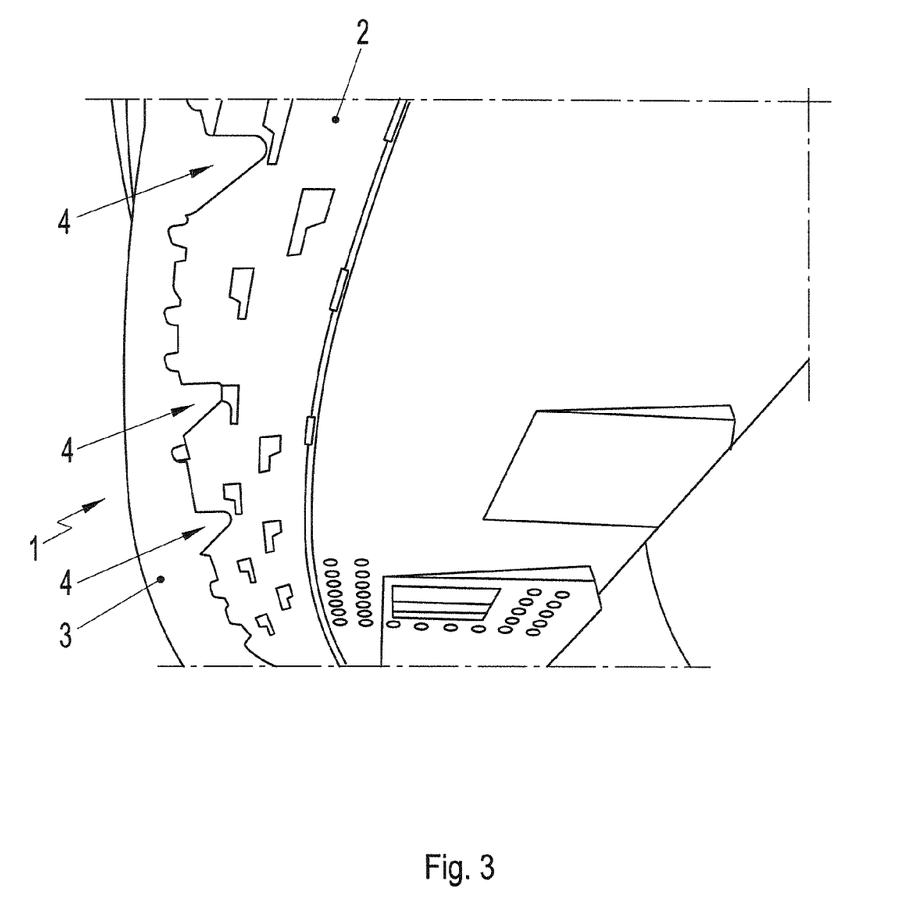
FIG. 3 is a bottom view of the front spoiler with reinforcing ribs.
Figure 4:
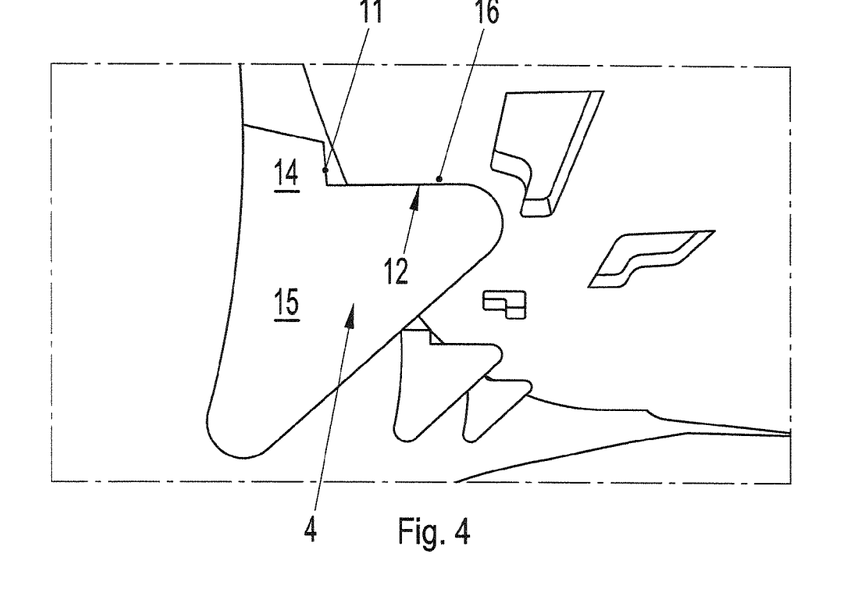
FIG. 4 is a diagrammatic detail view of the reinforcing ribs.
Figure 5:
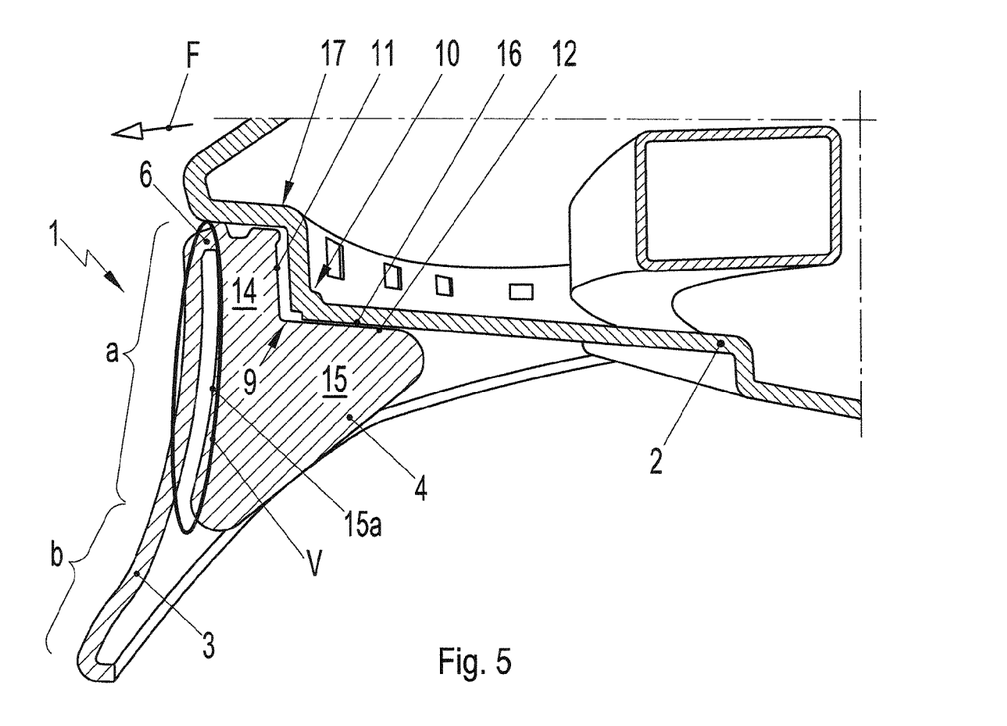
Figure 7:
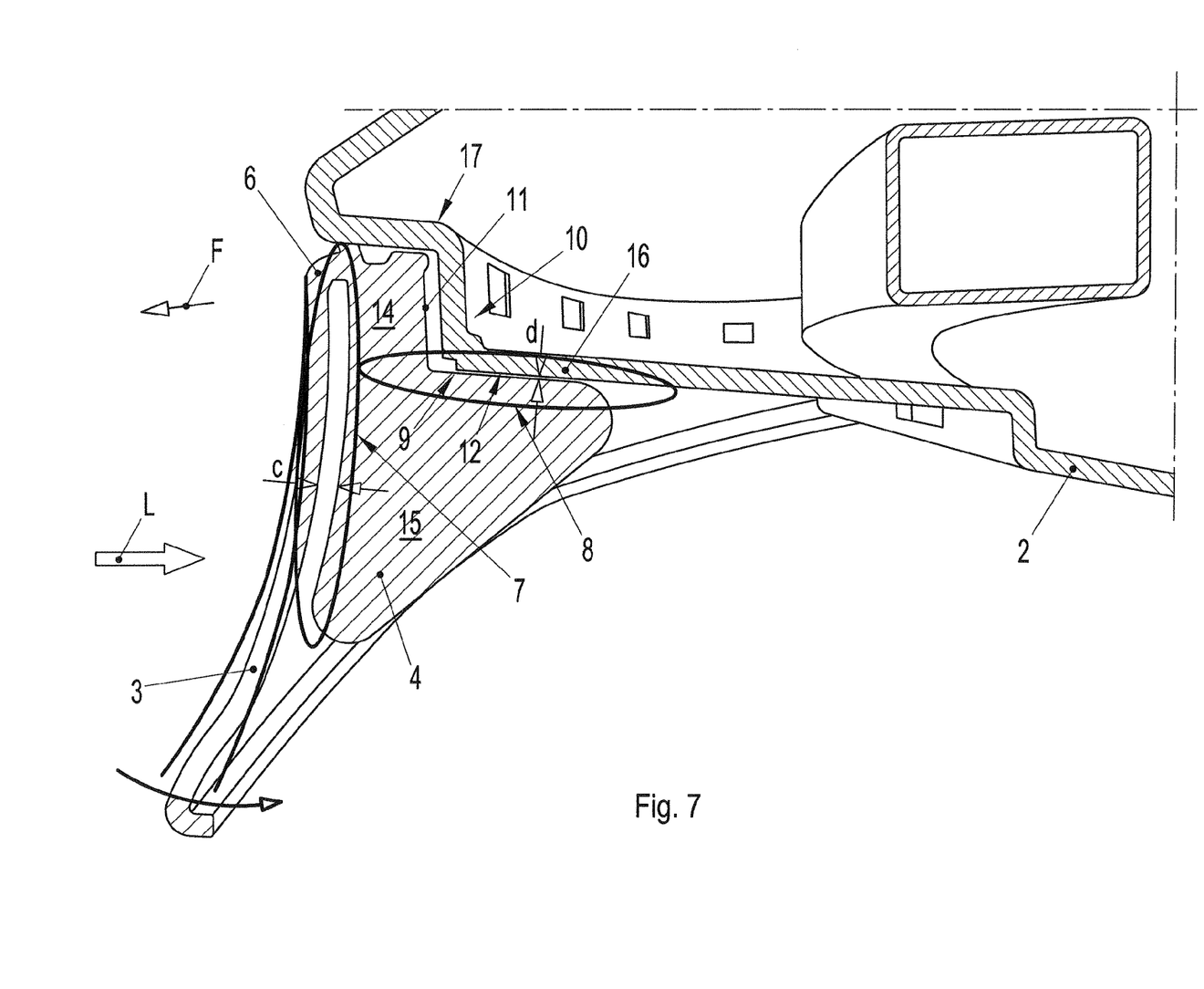
FIG. 7 is an arrangement of the spoiler element of the front spoiler in a basic position and in adjusted positions, as well as of a reinforcing rib.

Each reinforcing rib 4 has an angular cutout 9 nested with an angle 10 of the front end part 2. The angular cutout 9 of the reinforcing rib 4 has a vertical rib edge 11 and a horizontal rib edge 12. The vertical rib edge 11 is formed on a rectangular rib portion 14 connected to the head strip 6, and the horizontal rib edge 12 is formed by an adjoining triangular rib portion 15, as shown in FIGS. 5 and 7. As explained above, the rib edge 12 of the cutout 9 is a distance d from the opposing face 16 of the front end part 2.

The angular cutout 9 of the reinforcing rib 4 overlaps the angle 10 of the front end part 2 from below and from the outside, and the rectangular rib portion 14 is arranged in an angled front offset 17 of the front end part 2.

The head strip 6 of the spoiler element 3 forms the elastic pivoting axis or bending axis, about which the spoiler element 3 of the front spoiler 1 can pivot elastically relative to the reinforcing ribs 4. Thus, the spoiler element 3 can pivot about the pivoting axis from the basic position R into the adjusted positions I and II in accordance with the air forces L arising counter to the direction of travel F and, in the positions I and II, the spoiler element 3 is in contact with the front edge 15a of the support rib 4 and the extending rib edge 12 of the cutout 9 of the reinforcing rib 4 is in contact with the bottom surface 16 of the front end part 2. Thus, rearward movement of the front spoiler 1 counter to the direction of travel F is blocked.

Fastening hooks 20 are formed on the head strip 6 and latch into openings 21 in the front end part 2 to fix the front spoiler 1 on the front end part 2. Plates 22, 23 are formed at the free outer ends of the spoiler element 3 and extend rearward on the underside of the front end part 2 over a relatively large area. The plates 22, 23 form a support for the front spoiler 1 on the front end part 2 and can be involved in the fastening process.

Figure 6:
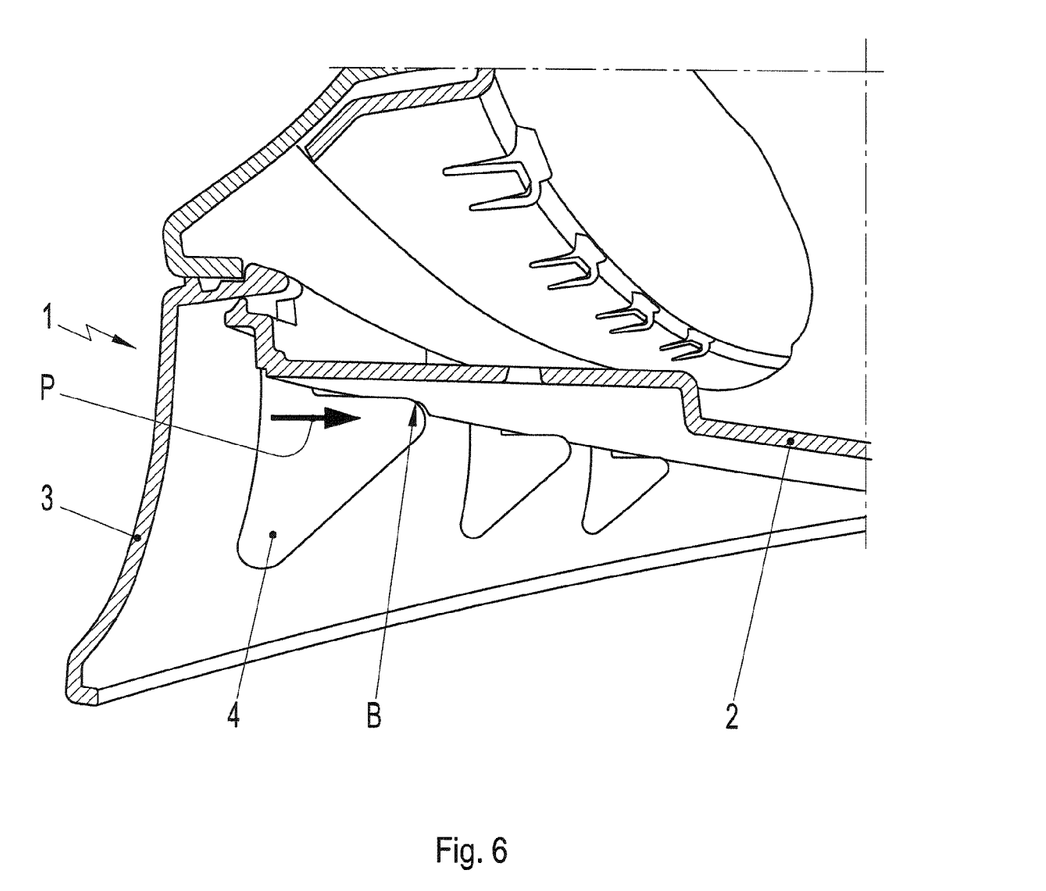
FIG. 6 is a vertical section through the front spoiler held on the front end part, together with fastening hooks and the arrangement of the reinforcing ribs on the front end part without a collision with adjacent components.
Figure 8:
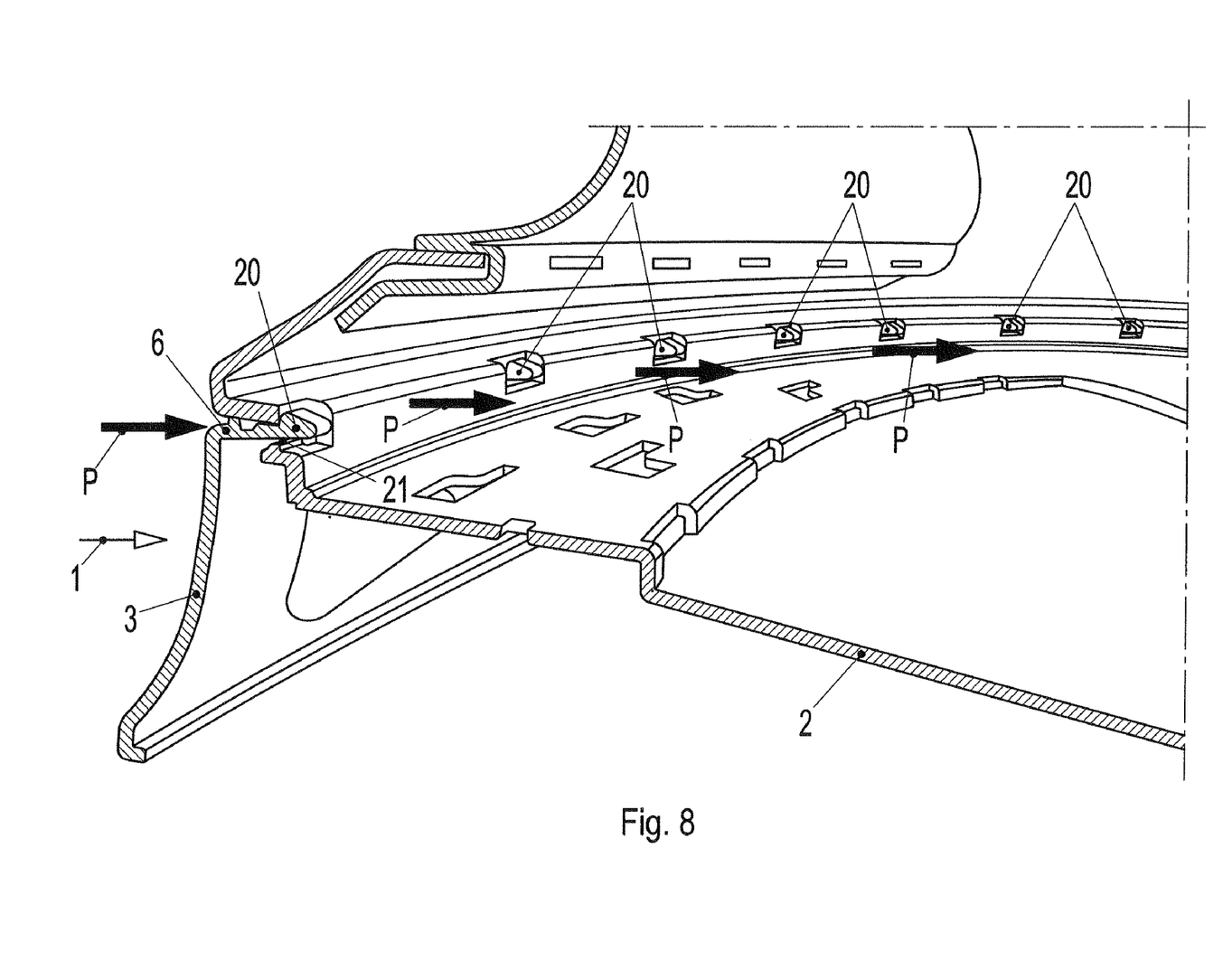
FIG. 8 is a diagrammatic illustration of a head strip of the spoiler element of the front spoiler with latching hooks latched into the front end part.

The front spoiler 1 is mounted on the front end part 2 in a main direction of mounting in the direction of arrow P shown in FIG. 8, and mounting takes place without a collision with adjacent component B (FIG. 6). After mounting, the reinforcing ribs 4 are arranged relative to surrounding components, such as the front end part 2, so that no traces can arise on the outer skin to provide advantageous styling and an impression of quality.

What is claimed is:

1. A front spoiler for a motor vehicle, comprising: a head strip connected to a front end part of the motor vehicle and extending in a transverse direction of the vehicle; a spoiler element projecting down from the head strip and extending in the transverse direction of the vehicle, the spoiler element having an aerodynamically effective front air impingement surface facing forward on the vehicle; and a reinforced portion in a central region of the front spoiler at both sides of a vehicle longitudinal center line, the reinforced portion having plate-shaped reinforcing ribs projecting down from the head strip less than a downward projection of the spoiler element and extending in a longitudinal direction of the vehicle, the reinforcing ribs being spaced rearward of the spoiler element by a gap so that the spoiler element has a reinforced region opposed to the reinforcing ribs with limited rearward deflection and an elastically flexible region adjoining the reinforced region and projecting below the reinforcing ribs.

2. The front spoiler of claim 1, wherein the flexible region of the spoiler element is below a horizontal plane passing through the free ends of the reinforcing ribs and the reinforced region is above the horizontal plane, deflection characteristics of the spoiler element being determined by vertical dimensions of the reinforcing ribs.

3. The front spoiler of claim 1, wherein the reinforced region of the spoiler element is elastically deflectable rearwardly about the transversely extending head strip and into the gap until a rear surface of the spoiler element contacts front edges of the reinforcing ribs.

4. The front spoiler of claim 1, wherein each of the reinforcing ribs has an angular cutout in an upper region, the cutout nesting with a convex angle of the front end part while being held at a distance from front end part in proximity to the convex angle.

5. The front spoiler of claim 4, wherein the angular cutout of each of the reinforcing ribs comprises vertical and horizontal rib edges, the vertical rib edge being formed on a rectangular rib portion connected to the head strip, and the horizontal rib edge being formed on a triangular rib portion adjoining the rectangular rib portion.

6. The front spoiler of claim 5, wherein the angular cutout of the reinforcing rib overlaps the convex angle of the front end part from below and forward, and the rectangular rib portion is arranged in a concave angled front offset of the front end part.

7. The front spoiler of claim 4, wherein the head strip of the spoiler element forms an elastic pivoting axis about which the spoiler element is pivotable toward the reinforcing ribs from an unbiased position into adjusted positions in response to air forces arising counter to a direction of travel, the spoiler element contacting the reinforcing ribs to define a maximum elastic pivoting.

8. The front spoiler of claim 7, wherein the horizontal rib edge of the cutout of each of the reinforcing ribs contacts a bottom surface of the front end part to further limit elastic pivoting of the spoiler element about the head strip.

9. The front spoiler of claim 1, wherein the head strip has fastening hooks for connection to openings in the front end part.

10. The front spoiler of claim 1, further comprising horizontally aligned plates at opposite free lateral ends of the spoiler element and extending rearward across an underside of the front end part, the plates being connectable to the front end part.

* * * * *